United States Patent
Connors

(10) Patent No.: US 9,731,683 B2
(45) Date of Patent: Aug. 15, 2017

(54) WIPER SYSTEM HAVING RESILIENT INTERFACE ASSEMBLY FOR WORM-DRIVEN REDUCTION GEAR MOTOR

(71) Applicant: Trico Products Corporation, Rochester Hills, MI (US)

(72) Inventor: James C. Connors, Southfield, MI (US)

(73) Assignee: Trico Products Corporation, Rochester Hills, MI (US)

( * ) Notice: Subject to any disclaimer, the term of this patent is extended or adjusted under 35 U.S.C. 154(b) by 228 days.

(21) Appl. No.: 14/092,229

(22) Filed: Nov. 27, 2013

(65) Prior Publication Data

US 2015/0143654 A1    May 28, 2015

(51) Int. Cl.
*B60S 1/16* (2006.01)
*B60S 1/08* (2006.01)
*B60S 1/24* (2006.01)

(52) U.S. Cl.
CPC .......... *B60S 1/166* (2013.01); *B60S 1/08* (2013.01); *B60S 1/24* (2013.01)

(58) Field of Classification Search
CPC .......... B60S 1/166; B60S 1/24; B60S 1/3493; B60S 1/3495
USPC .... 15/250.3, 250.31, 250.29, 250.34, 250.27
See application file for complete search history.

(56) References Cited

U.S. PATENT DOCUMENTS

| | | | | |
|---|---|---|---|---|
| 2,540,319 A | * | 2/1951 | Bitzer | B60S 1/24 403/161 |
| 3,016,766 A | * | 1/1962 | Hoyler | B60S 1/24 15/250.3 |
| 3,085,821 A | * | 4/1963 | Ryck | B60S 1/3418 15/250.34 |
| 3,316,033 A | * | 4/1967 | Bila | B60S 1/24 384/125 |
| 3,702,718 A | * | 11/1972 | Tassell | F16C 23/04 384/203 |
| 3,790,985 A | * | 2/1974 | Kessler | B60S 1/34 15/250.34 |
| 4,380,860 A | | 4/1983 | Riester et al. | |
| 5,886,437 A | | 3/1999 | Bohn et al. | |
| 5,983,439 A | | 11/1999 | Hojnacki | |
| 6,059,294 A | * | 5/2000 | Gorce | B60S 1/34 15/250.34 |
| 6,292,975 B1 | | 9/2001 | Isii et al. | |

(Continued)

OTHER PUBLICATIONS

Definition of abut in Oxford Dictionary, 2016.*
Mar. 13, 2015 International Search Report and Written Opinion for PCT/US2014/066617.

*Primary Examiner* — Andrew A Horton
(74) *Attorney, Agent, or Firm* — Miller Canfield

(57) ABSTRACT

A wiper system includes at least one wiper assembly, a linkage assembly connected to the at least one wiper assembly, and at least one worm-driven reduction gear motor having a housing, an output shaft rotatably supported by the housing, and a motor arm connected to the output shaft and the linkage assembly to drive the at least one wiper assembly in repeated wiping motion across a surface to be wiped. The wiper system also includes a resilient interface assembly disposed between the housing and the motor arm to provide resistance to loading deflection and damp axial and cross-axial movement of the output shaft of the motor.

10 Claims, 5 Drawing Sheets

(56) References Cited

U.S. PATENT DOCUMENTS

| | | |
|---|---|---|
| 6,393,653 B1 | 5/2002 | Harris et al. |
| 6,691,366 B1 | 2/2004 | Zimmer |
| 6,941,611 B2 * | 9/2005 | Kashiwagi ............ B60S 1/0488 15/250.3 |
| 7,171,718 B2 | 2/2007 | Moein et al. |
| 7,265,475 B2 | 9/2007 | Suminski |
| 7,739,771 B2 | 6/2010 | Powell, Jr. |
| 2002/0152575 A1 * | 10/2002 | Tsukamoto ........... B60S 1/3481 15/250.352 |
| 2004/0226128 A1 | 11/2004 | Sugiyama |
| 2006/0117514 A1 | 6/2006 | Yagi et al. |
| 2011/0067198 A1 | 3/2011 | Powell, Jr. |

* cited by examiner

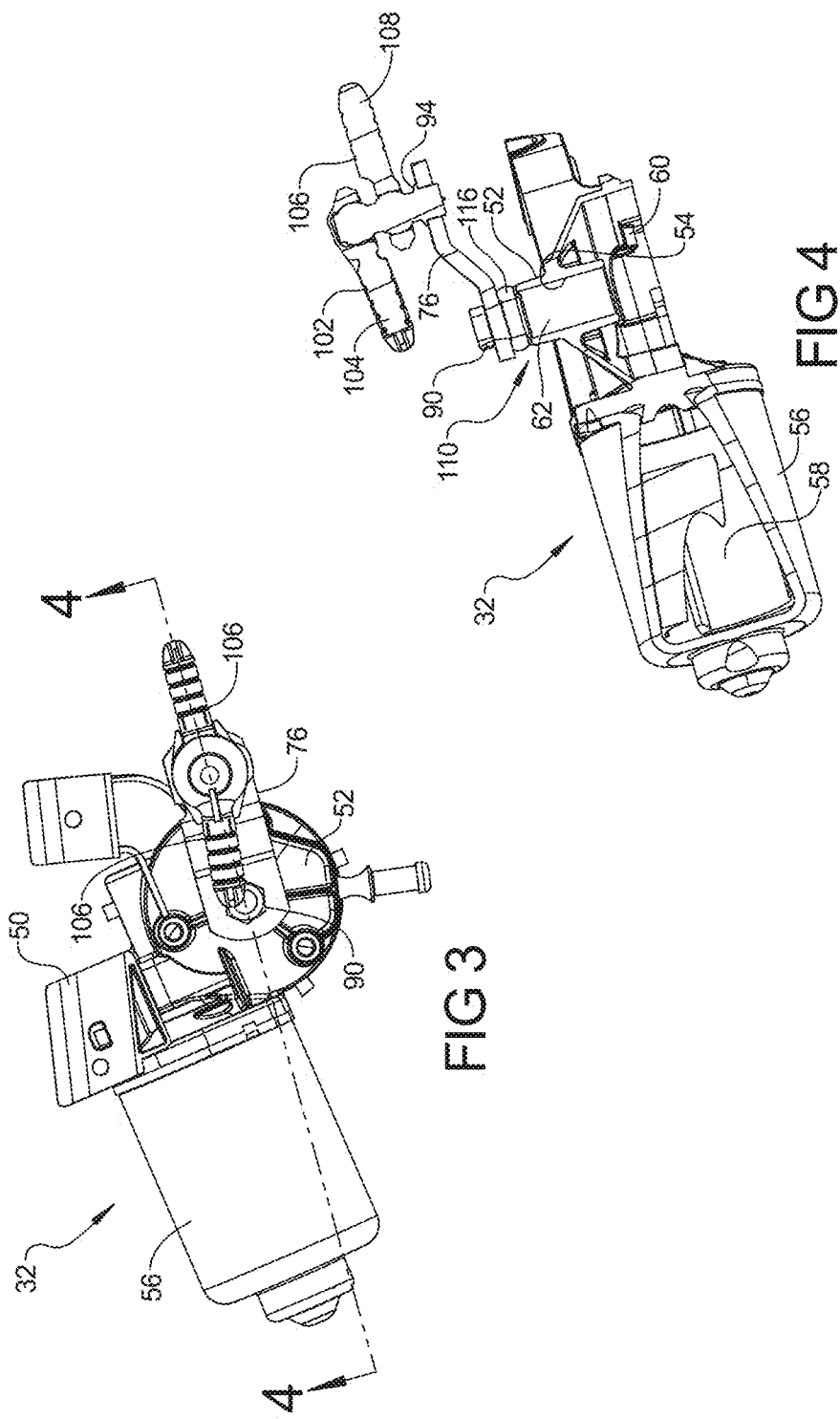

WIPER SYSTEM HAVING RESILIENT INTERFACE ASSEMBLY FOR WORM-DRIVEN REDUCTION GEAR MOTOR

BACKGROUND OF THE INVENTION

1. Field of the Invention

The present invention relates generally to wiper systems and, more particularly, to a wiper system that utilizes a resilient interface assembly for a worm-driven reduction gear motor for control of wiper assemblies.

2. Description of the Related Art

Wiper systems commonly employed in the related art include pivotally mounted wiper assemblies that are oscillated across a surface such as a windshield between an in-wipe position, typically located near the cowl of a vehicle, and an out-wipe position, usually associated with an A-pillar on the vehicle, in the case of the driver side wiper assembly in this representative example. It is typically desirable to maximize the angular velocity of the wiper assemblies between the in-wipe and out-wipe positions where the wiper assembly is moving across the windshield in front of the driver to reduce the duration of each wipe cycle. On the other hand, it is also desirable to limit noise and inertia loading by reducing the velocity of the wiper assemblies as they approach the wipe limits. These are two competing objectives that must be balanced in order to be successfully and economically obtained.

One long-standing design approach that has been employed in the related art includes the use of a worm-driven reduction gear motor, driven in one rotational direction, driving two separate wiper arms across the windshield of the vehicle. This approach requires a linkage system to convert the singular angular motion of the motor into the two-way linear reciprocal motion to drive both wiper arms. Typically, a "pal-nut" or metal wave spring has been used for regulating axial travel on an output shaft of the worm-driven reduction gear motor.

One disadvantage of conventional construction of worm-driven reduction gear motors is the loading deflection and axial and cross-axial movement of the output shaft. Another disadvantage is that the pal-nut and metal wave spring are used for regulating only axial travel of the output shaft. Yet another disadvantage is that the pal-nut and metal wave spring have single purpose/axis regulation of the output shaft. Still another disadvantage is that the pal-nut and metal wave spring have a linear spring rate and are subject to rust and corrosion. Thus, there is a need in the art for a wiper system including a worm-driven reduction gear motor to have an interface to damp mechanical inputs resulting from a connected load.

SUMMARY OF THE INVENTION

The disadvantages associated with the related art are overcome in the wiper system of the present invention. The wiper system includes at least one wiper assembly, a linkage assembly connected to the at least one wiper assembly, and a worm-driven reduction gear motor having a housing, an output shaft rotatably supported by the housing, and a motor arm connected to the output shaft and the linkage assembly to drive the at least one wiper assembly in repeated wiping motion across a surface to be wiped. The wiper system also includes a resilient interface assembly disposed between the housing and the motor arm to provide resistance to loading deflection and damp axial and cross-axial movement of the output shaft of the motor.

In this way, the wiper system of the present invention has a resilient interface assembly for a worm-driven reduction gear motor that provides resistance to loading deflection and will damp axial and cross-axial movement of the output shaft of the motor. The resilient interface assembly of the present invention is a torus-shaped elastomeric spring installed onto the output shaft of the worm-driven gear reduction motor between a gear case or housing and a motor lever or arm on the worm-driven gear reduction motor. The resilient interface assembly of the present invention is under a slight compression when installed and the effect from this compressive load is to push up on the motor arm and down on the housing simultaneously, effectively pulling the reduction gear into the motor worm with a constant force. The resilient pressure on the resilient interface assembly between the worm and gear causes constant gear mesh while the motor runs during wiping. An additional effect from the resilient interface assembly of the present invention is that the lateral movement of the output shaft in its sleeve bearing is damped.

The immediate benefit from the installation of the resilient interface assembly of the present invention is a more predictable wear characteristic because wear is more predictable when wear inducing run events are regulated or made more constant. The resilient interface assembly of the present invention regulates worm and gear mesh load with the mechanical outcome from the constant gear mesh being a smoother run characteristic. The resilient interface assembly of the present invention continues to effect continuous and damped worm versus gear compliance over the reasonable life of the motor. The resilient interface assembly of the present invention results in a compact, durable, versatile, weather resistant, simple, and inexpensive product.

Other features and advantages of the present invention will be readily appreciated as the same becomes better understood by reference to the subsequent detailed description when considered in connection with the accompanying drawings.

BRIEF DESCRIPTION OF THE DRAWINGS

FIG. 3 is an enlarged plan view of a worm-driven reduction gear motor of the wiper system of FIG. 1.

FIG. 4 is a sectional view taken along line 4-4 of FIG. 3.

DETAILED DESCRIPTION OF THE PREFERRED EMBODIMENT(S)

Figure 1:
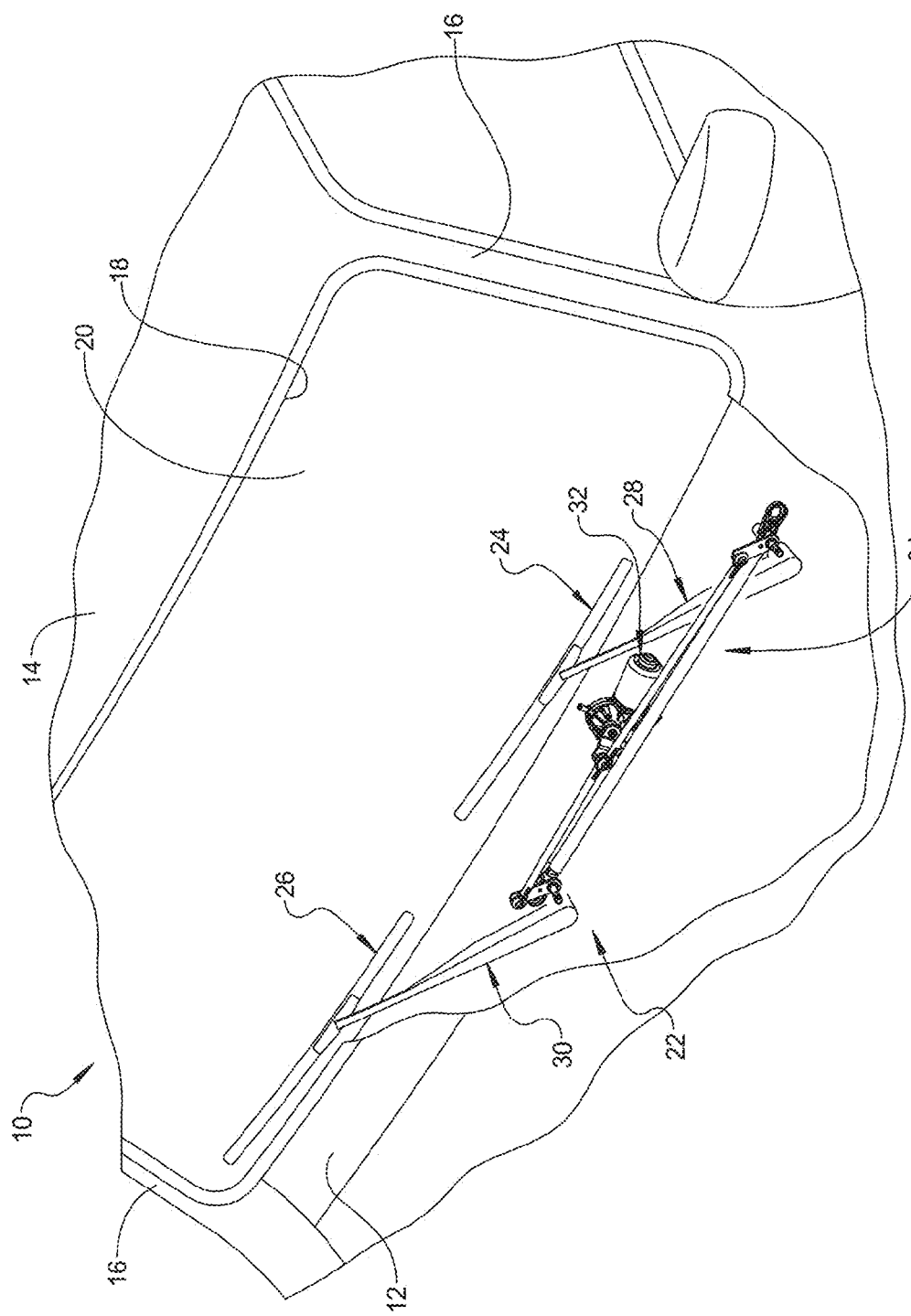
FIG. 1 is a partial perspective view of a front of a vehicle having a wiper system, according to one embodiment of the present invention.

Referring now to the figures, where like numerals are used to designate like structure, a portion of a vehicle is schematically illustrated at 10 in FIG. 1. The vehicle 10 includes a cowl 12, a roof 14, and a pair of laterally spaced front or "A" pillars 16 extending between the roof 14 and the cowl 12. The A-pillars 16, roof 14, and cowl 12 cooperate to define a generally rectangular opening 18 in which is supported a curved or "swept back" glass windshield 20.

A wiper system, according to the present invention, is generally indicated at 22 in FIG. 1 and is employed to clean the windshield 20. The wiper system 22 includes a pair of wiper assemblies, generally indicated at 24 and 26, which correspond to the driver and passenger side of the vehicle 10, respectively. Each wiper assembly 24, 26 is carried by a corresponding wiper arm assembly, generally indicated at 28, 30, respectively, of the wiper system 22. The wiper system 22 also includes an electrical motor, generally indicated 32, employed to power the wiper system 22 to move the wiper assemblies 24, 26 in an oscillating manner across a surface of the windshield 20.

Figure 2:
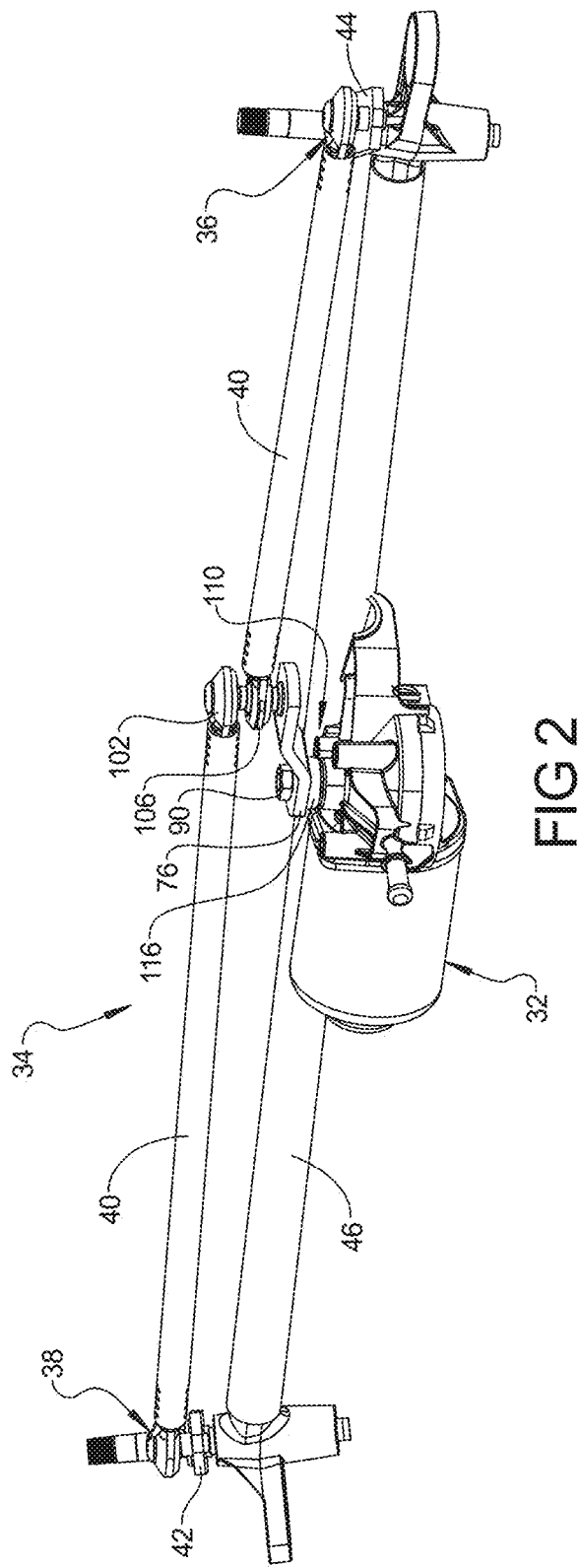
FIG. 2 is a perspective view of a portion of the wiper system of FIG. 1 illustrated without wiper arms and wiper assemblies.
Figure 5:
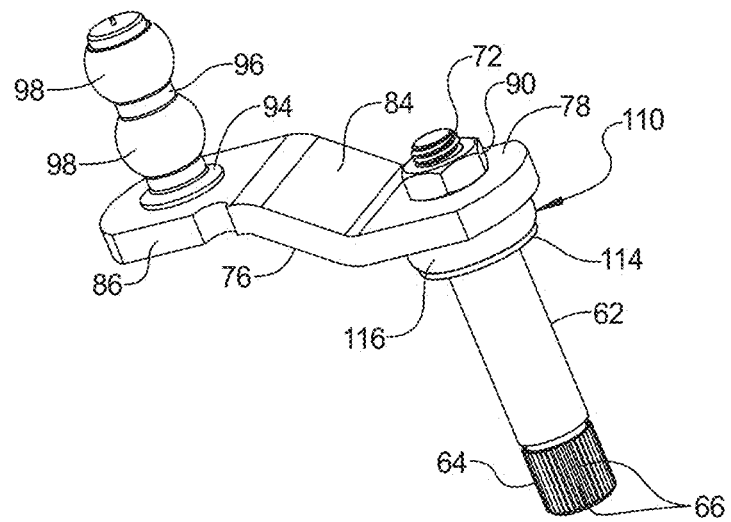
FIG. 5 is a perspective view of a resilient interface assembly, according to one embodiment of the present invention, and a portion of the worm-driven reduction gear motor of the wiper system of FIG. 1.
Figure 6:
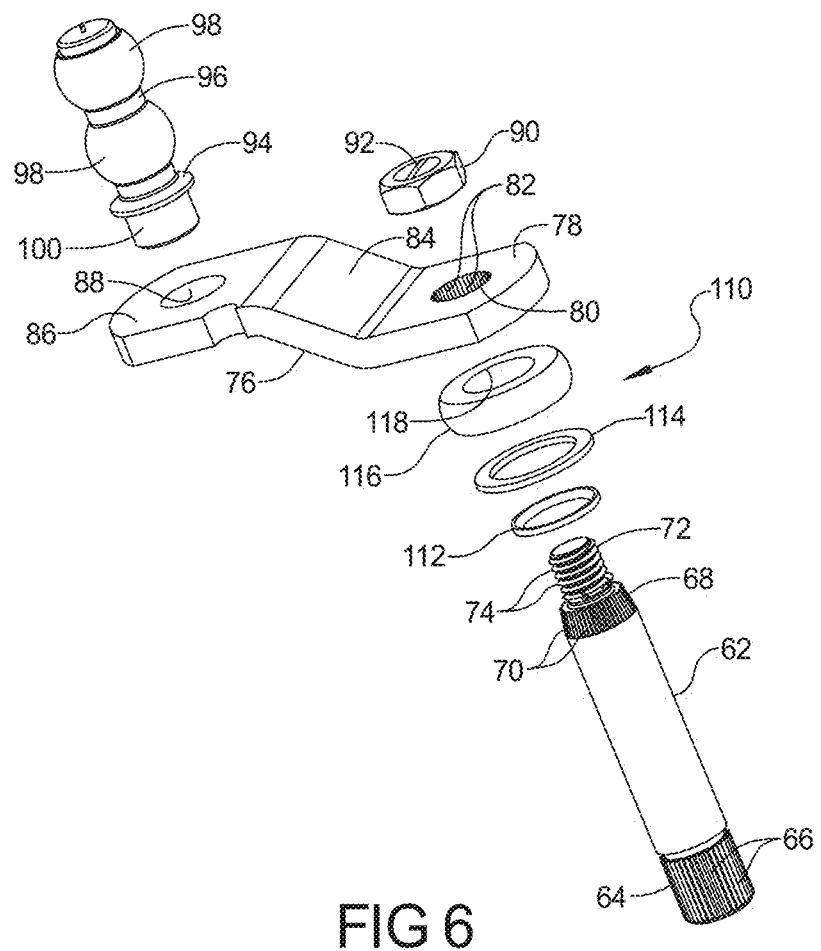
FIG. 6 is an exploded view of the resilient interface assembly, according to one embodiment of the present invention, and a portion of the worm-driven reduction gear motor of the wiper system of FIG. 1.

Referring to FIGS. 1 and 2, the wiper system 22 further includes a linkage assembly, generally shown at 34, interposed between the motor 32 and the wiper arm assemblies 28, 30 for translating rotational movement into pivotal movement of the wiper assemblies 24, 26 across the windshield 20. Each of the wiper arm assemblies 28, 30 is mounted to a pivot and shaft assembly 36, 38, respectively, of the linkage assembly 34. The linkage assembly 34 includes a linkage drive arm 40 which drives the passenger side wiper assembly 26 through the pivot and shaft assembly 38 and a pivot lever 42, and a linkage drive arm 40 which drives the driver side wiper assembly 24 through the pivot and shaft assembly 36 and through a similar pivot lever 44 acting through a linkage slave arm 46 extending between the driver and passenger pivot and shaft assemblies 36, 38. The linkage assembly 34 further includes a motor bracket 50 (FIG. 3) supporting the motor 32 and connected to structure of the vehicle 10. It will be appreciated by those having ordinary skill in the art that the linkage assembly 34 may take any number of different configurations or may be substantially eliminated to drive each wiper assembly 24, 26 through the pivot and shaft assemblies 36, 38 or similar structure.

Referring to FIGS. 2 through 4, the motor 32 is of a worm-driven gear reduction type. The motor 32 includes a housing 52 having a passageway 54 extending axially therethrough. The motor 32 also includes an armature case 56 in which an armature 58 is housed. The motor 32 may include a gear assembly having a reduction gear or drive wheel 60 with outer teeth formed about its outer circumference and an aperture extending axially therethrough with inner teeth formed about its circumference. The armature 58 is provided with an armature shaft having a worm gear formed on one end that operatively interacts with the outer teeth of the drive wheel 60 to cause the drive wheel 60 to rotate in response to the rotation of the armature 58. It should be appreciated that the motor 32 may be of a type disclosed in U.S. Pat. No. 7,265,475, the disclosure of which is expressly incorporated by reference. It should also be appreciated that the above-described armature and worm of the motor 32 is conventional and known in the art.

Referring to FIGS. 2 through 7, the motor 32 also includes an output shaft 62 extending axially through the passageway 54 of the housing 52. The output shaft 62 is rotatably supported by the housing 52 through a bearing sleeve (not shown). The output shaft 62 is generally cylindrical in shape. The output shaft 62 includes a gear portion 64 having a plurality of teeth 66 at one axial end disposed within the housing 52 and meshingly engaging the inner teeth of the drive wheel 60. The output shaft 62 also has a tapered portion 68 extending axially near one axial end and external to the housing 52. The tapered portion 68 has a plurality of splines 70 disposed circumferentially thereabout. The output shaft 62 further has a threaded portion 72 with a plurality of threads 74 and extending axially adjacent the tapered portion 68. The output shaft 62 is made of a metal material and is integral, unitary, and one-piece.

The motor 32 further includes a motor lever or arm 76 at the axial end of the output shaft 62 external to the housing 52. The motor arm 76 has a first end 78 having an aperture 80 extending therethrough. The aperture 80 is tapered complementary to the tapered portion 68 and receives the tapered portion 68 of the output shaft 62. The motor arm 76 also has a plurality of splines 82 disposed about the aperture 80 to engage the splines 78 on the tapered portion 68 of the output shaft 62. The motor arm 76 has an intermediate portion 84 extending at an angle from the first end 78. The motor arm 76 further has a second end 86 extending axially from the intermediate portion 84. The second end 86 has an aperture 88 extending therethrough. The motor arm 76 is made of metal and is integral, unitary, and one-piece.

The motor 32 also includes a nut 90 having a plurality of threads 92 threaded onto the threads 74 of the threaded portion 72 of the output shaft 62 adjacent the motor arm 76. The nut 90 prevents the first end 78 of the motor arm 76 from exiting the end of the output shaft 62. The motor 32 also includes a ball pin 94 disposed at the second end 86 of the motor arm 76. The ball pin 94 includes a shaft 96 having one or more balls 98 spaced axially therealong. The shaft 96 has an enlarged end 100 disposed in the aperture 88 of the second end 86 of the motor arm 76 and fixed thereto by an interference fit. The motor 32 further includes a first connector member 102 connected to one of the balls 98. The first connector member 102 has a plug portion 104 extending axially and is disposed in one end of one of the linkage drive arms 40. The motor 32 also includes a second connector member 106 connected to the other one of the balls 98. The second connector member 106 has a plug portion 108 extending axially and is disposed in one end of the other one of the linkage drive arms 40.

The motor 32 further includes a resilient interface assembly, generally indicated at 110 and according to the present invention, disposed axially between the housing 52 and the motor arm 76. The resilient interface assembly 110 includes a first washer 112 disposed about the output shaft 62 and adjacent the housing 52 and a second washer 114 disposed about the output shaft 62 and adjacent the first washer 112. The washers 112 and 114 are made of a plastic material such as nylon. The resilient interface assembly 110 also includes torus-shaped spring 116 disposed between the second washer 114 and the motor arm 76. The spring 116 is generally circular in shape and has an aperture 118 extending axially therethrough. The spring 116 has a height slightly greater than an installed clearance or space axially between the housing 52 and the motor arm 76. The spring 116 is a resilient member made from a durable, weather resistant elastomer. It should be appreciated that this elastomer has a greater ability to flex in compression and then return to normal shape afterward than would a conventional metal spring. It should also be appreciated that this elastomer has the ability to distribute loading onto its whole surface area, making it possible to load and deform the spring 116 in multiple axes repeatedly, as opposed to the single response axis of a metal spring.

Figure 7:
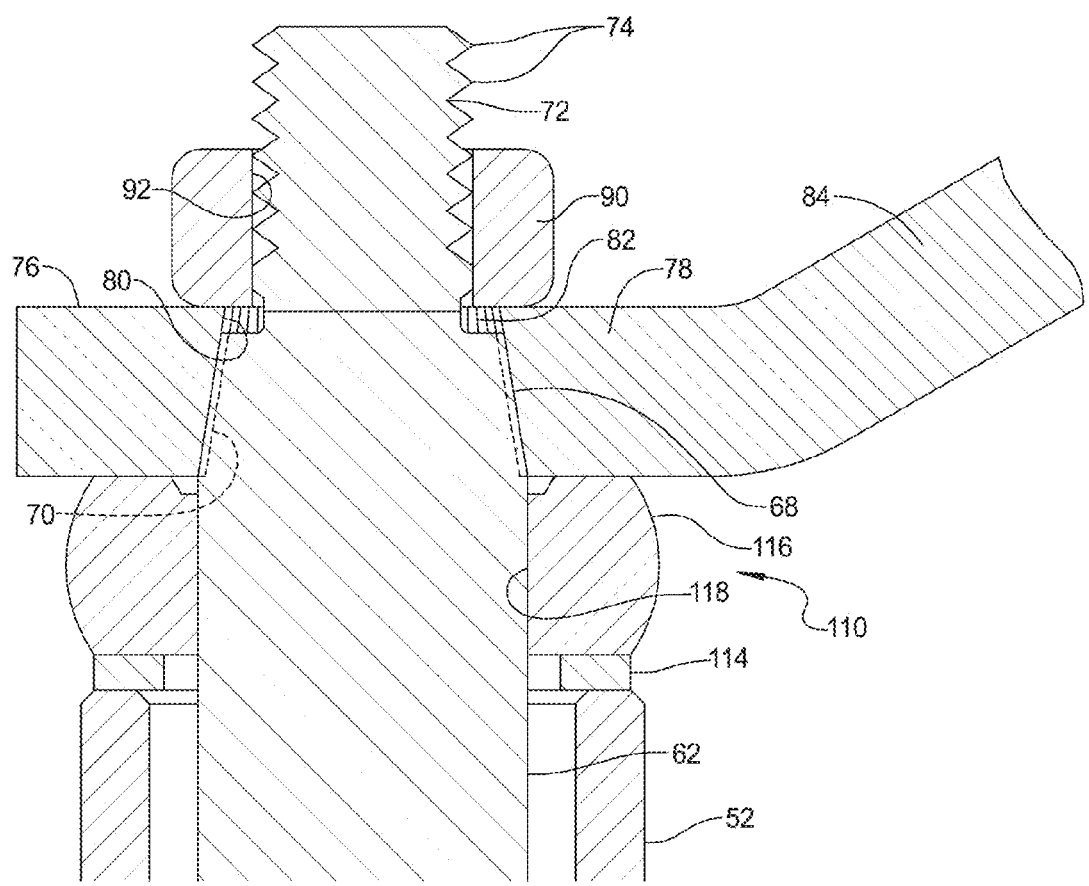
FIG. 7 is a fragmentary view of the resilient interface assembly, according to one embodiment of the present invention, and a portion of the worm-driven reduction gear motor of the wiper system of FIG. 1.

As illustrated in FIG. 7, the spring 116 is under compression when installed between the surfaces of the housing 52 and the motor arm 76. From a physical standpoint, the compressed state causes a slightly deflected, flattened torus shape and reduced torus-hole diameter of the spring 116. From a mechanical standpoint, the compressed state causes the spring 116 to store the energy required to return to a resting state on all of its surfaces.

The worm versus gear regulation results when the resilient interface assembly 110 is loaded during installation and a constant simultaneous outward pressure from the assembly 110 is applied upwardly onto the motor arm 76 and downwardly on the housing 52, providing resistance to uneven external loading from unbalanced interpreted motion of the motor 32 and pulls the reduction gear or drive wheel 60 into the worm with a constant force, causing constant and regulated worm versus gear mesh during wiping or other interpreted motion of the motor 32. Cross-axial movement regulation results when the assembly 110 is loaded during installation and a slightly decreased torus-hole diameter of the spring 116 causes the assembly 110 to capture and hold the output shaft 62 with a slight spring load. The result from this is that the cross-axial movement of the output shaft 62 in its sleeve bearing is damped and regulated by the installed resilient interface assembly 110.

The resilient interface assembly 110 of the present invention results in a compact, durable, versatile, weather resistant simple and inexpensive product. The resilient interface assembly 110 may be installed onto the output shaft 62 of the motor 32 during production in a manual push-on operation prior to the motor arm 76 being installed without the need for additional tooling or line modification.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A wiper system comprising:
   at least one wiper assembly;
   a linkage assembly connected to said at least one wiper assembly;
   a worm-driven reduction gear motor having a housing, an output shaft rotatably supported by said housing, and a motor arm connected to said output shaft and said linkage assembly to drive said at least one wiper assembly in repeated wiping motion across a surface to be wiped; and
   a resilient interface assembly comprising a first washer disposed about said output shaft adjacent to and in abutting contact with said housing a second washer disposed about said output shaft adjacent said first washer, and a resilient member disposed about one axial end of said output shaft between and in abutting contact with said second washer and said motor arm to provide resistance to loading deflection and damp axial and cross-axial movement of said output shaft of said motor.

2. A wiper system as set forth in claim 1 wherein said resilient member is a torus-shaped spring.

3. A wiper system as set forth in claim 2 wherein said output shaft has a threaded portion.

4. A wiper system as set forth in claim 3 including a nut secured to said threaded portion of said output shaft.

5. A wiper system as set forth in claim 1 wherein said resilient member is made from a resilient elastomer.

6. A wiper system as set forth in claim 1 wherein said spring has an axial height greater than a clearance between said housing and said motor arm along said output shaft.

7. A windshield wiper system comprising:
   at least one wiper assembly;
   a linkage assembly connected to said at least one wiper assembly;
   a worm-driven reduction gear motor having a housing, an output shaft rotatably supported by said housing and having a tapered portion external to said housing, and a motor arm connected to said output shaft and said linkage assembly to drive said at least one wiper assembly in repeated wiping motion across a surface of a windshield; and
   a resilient interface assembly comprising a first washer disposed about said output shaft adjacent to and in abutting contact with said housing, a second washer disposed about said output shaft adjacent said first washer, and a torus-shaped resilient member disposed about one axial end of said output shaft of said worm-driven reduction gear motor between and in abutting contact with said second washer and said motor arm to provide resistance to loading deflection and damp axial and cross-axial movement of said output shaft of said motor.

8. A windshield wiper system as set forth in claim 7 wherein said resilient member is made from a resilient elastomer.

9. A windshield wiper system as set forth in claim 7 wherein said output shaft has a threaded portion at one end, and further including a nut secured to said threaded portion.

10. A wiper system as set forth in claim 7 wherein said spring has an axial height greater than a clearance defined between said housing and said motor arm along said output shaft.

* * * * *